Oct. 7, 1958 D. E. WIEGAND 2,855,465

MAGNETIC MODULATOR HEAD FOR NARROW TRACK RECORDS

Filed Nov. 6, 1953 2 Sheets-Sheet 1

Inventor
DAVID E. WIEGAND
By Hill, Sherman, Meroni, Gross & Simpson Attys.

Oct. 7, 1958 D. E. WIEGAND 2,855,465

MAGNETIC MODULATOR HEAD FOR NARROW TRACK RECORDS

Filed Nov. 6, 1953 2 Sheets-Sheet 2

Inventor
DAVID E. WIEGAND

By Hill, Sherman, Meroni, Gross & Simpson
Attys.

United States Patent Office 2,855,465

Patented Oct. 7, 1958

2,855,465

MAGNETIC MODULATOR HEAD FOR NARROW TRACK RECORDS

David E. Wiegand, Villa Park, Ill., assignor to Armour Research Foundation of Illinois Institute of Technology, Chicago, Ill., a corporation of Illinois Application November 6, 1953, Serial No. 390,525

17 Claims. (Cl. 179—100.2)

This invention relates to a multiple head for narrow track records and more particularly to such a head utilizing the magnetic modulator principle.

In applications where it is required to record a large amount of information at a very rapid rate, such as in the recording of television signals, it has been necessary in the past to utilize a plurality of heads disposed in staggered relation across the width of the record medium. The present invention involves a multiple head wherein the gaps are disposed in a straight line so that intelligence is recorded in transverse lines across the record medium. Thus, if the recorded lines are related as in a television signal, scanning requirements are much less exacting since scanning of the recorded signal may take place between recorded lines and the signal still properly reproduced. Under such circumstances, the visual image represented by the video signal is actually transformed into a magnetic image on the magnetic record medium.

It is therefore an important object of the present invention to provide a multiple head wherein the gaps are disposed in a straight line across the head.

It is a further object of the present invention to provide a multiple gap head having isolated closely spaced gaps.

It is another object of the present invention to provide a multiple gap head which will provide relatively high signal levels for easy amplification.

It is a further object of the present invention to provide a multiple gap head wherein the head is of a minimum overall width for the number of channels over which the head operates.

It is still another object of the present invention to provide a novel multiple gap head which is especially suited for recording and reproducing television signals.

The novel features which I believe to be characteristic of my invention are set forth with particularity in the appended claims. My invention itself, however, as to its organization, manner of construction and method of operation, together with further objects and advantages thereof may be best understood with reference to the following description taken in connection with the accompanying drawings, in which:

The multiple gap head of the present invention may be built up from a plurality of head lamination assemblies. Each head lamination assembly comprises a pair of core laminations 11 and 12 which may be of mumetal, and a pair of bridging strips 13 and 14 sandwiched between the core laminations. More particularly laminations 11 and 12 may comprise pairs of inverted L-shaped strips 11_a_, 11_b_, and 12_a_, 12_b_ defining a non-magnetic gap 16, Figure 6. A copper shim may be utilized for accurate definition of the gap. The bridging strips 13 and 14, which may be of moly-Permalloy, may receive mandrels having head-exciting windings thereon and indicated diagrammatically at 18 and 19.

Figure 1:
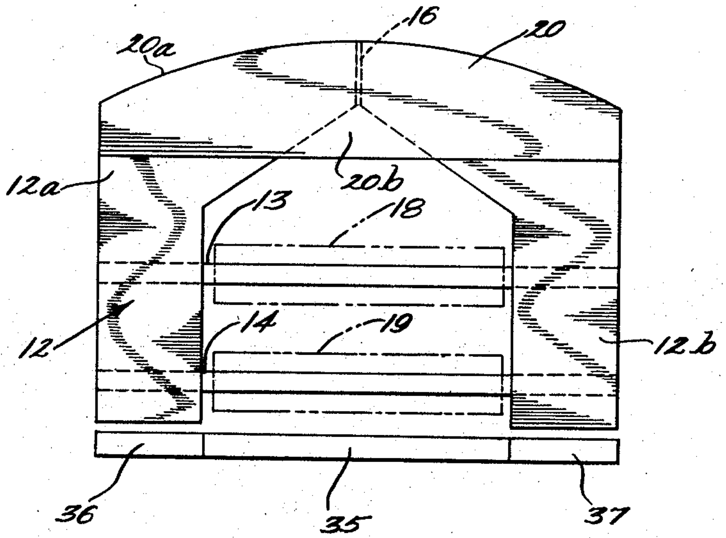
Figure 1 is a side elevational view of a multiple gap head according to the present invention.
Figures 2, 4:
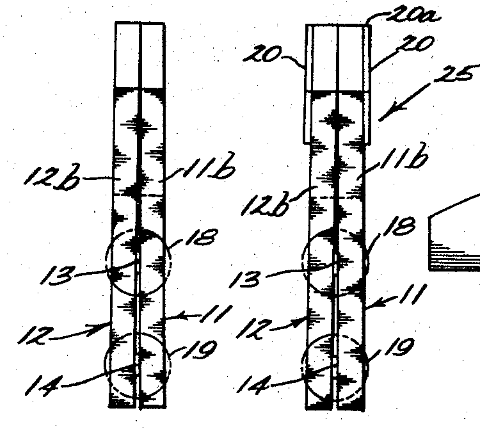
Figure 2 is an end elevational view of a core lamination unit for the multiple gap head of the present invention.
Figure 4, is an end elevational view of a head lamination assembly according to the present invention.
Figure 3:
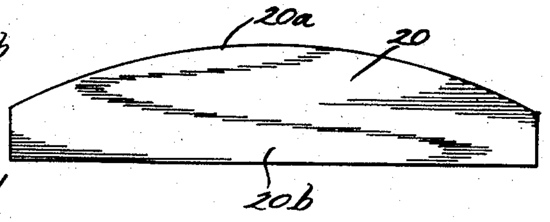
Figure 3 is a side elevational view of a copper strip to be applied on either side of the core lamination unit of Figure 2.

As indicated in Figures 3 and 4, at each side of the core lamination assembly, a copper eddy current shield 20 may be disposed to isolate the gaps of adjacent lamination assemblies. These shields may have curved upper edges 20_a_ corresponding to the curved contour of the upper edges of the L-members such as 12_a_ and 12_b_ in Figure 1. It will be noted that the portion 20_b_ of the copper shield 20 overlies the window defined by the L-pieces such as 12_a_ and 12_b_ to prevent leakage flux from interfering with adjacent lamination assemblies. The eddy current shields 20 may be cemented or otherwise bonded to each side of the head lamination as indicated in Figure 4.

Figure 9:
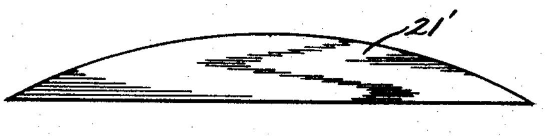
Figure 9 is a side elevational view of a modified form of mumetal shield strip.

Further, a mumetal shield 21 identical in shape to copper shield 20 is provided for bonding to the exposed sides of the copper shields to further isolate adjacent gaps and to isolate adjacent channels during reproduction. To reduce leakage in the lamination assemblies, the mumetal shield may be modified as indicated at 21' in Figure 9 so that the copper shield portions 20_b_ serve to isolate the mumetal shield 21' from the lamination assemblies.

Figure 5:
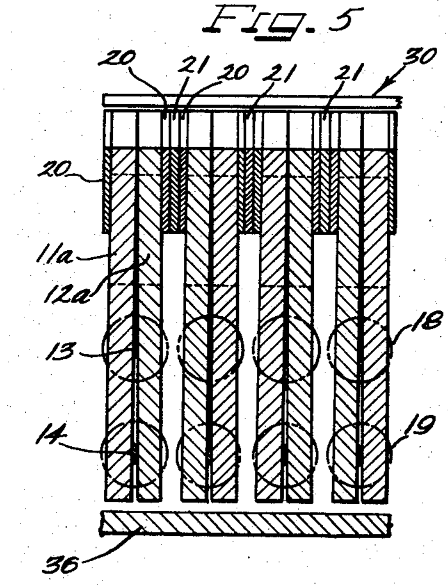
Figure 5 is a vertical sectional view of the multiple gap head of Figure 1, and illustrating the build-up of core laminations, copper strips, and mumetal strips to provide the isolated gaps of the multiple head.
Figure 6:
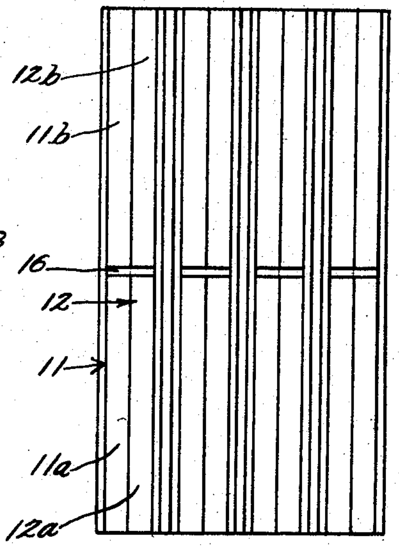
Figure 6 is a top plan view of the multiple gap head assembly of Figure 5.

Figures 5 and 6 illustrate the manner in which the head laminations are built up with copper shields 20 and magnetic shields 21 to produce the multiple gap head. By way of example and not of limitation, if the core laminations 11 and 12 are .010 inch thick and the bridging strips are .001 inch thick, the windings may be wound on a .010 inch diameter mandrel and may, for example, be bifilar windings of 5 turns, 2 strands and of #32 HF wire wound in a single layer. As indicated in Figure 5 under these circumstances, the windings would not protrude beyond the shields 20 on either side of the core laminations, so that the windings are entirely within one head lamination assembly 25 such as indicated in Figure 4. The eddy current shields 20 could be .005 inch thick and the magnetic shields 21 and 21' could likewise be .005 inch in thickness. With the above dimensions, the multiple head of the present invention would have approximately 29 gaps per inch. However, it is contemplated that the head lamination assemblies could be sufficiently thin so that 100 gaps per inch would be possible without undue cross effect and with adequate signal level.

Figure 7:
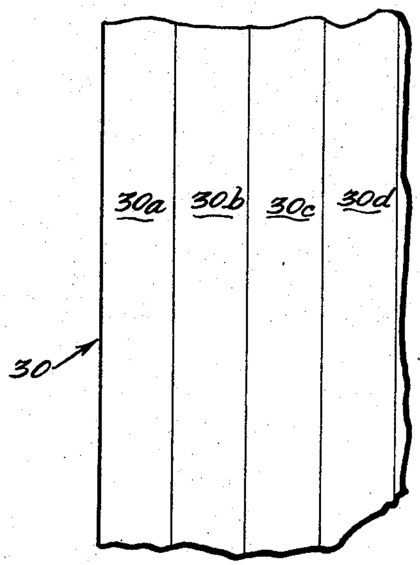
Figure 7 is a diagrammatic illustration in plan of a multiple channel tape for cooperating with the assembly of Figure 6.

Figures 5 and 7 illustrates diagrammatically a magnetic tape 30 having a plurality of channels 30_a_, 30_b_, 30_c_ and 30_d_ for travel over the respective lamination assemblies in reproduction of a signal recorded on the tape.

Figure 8:
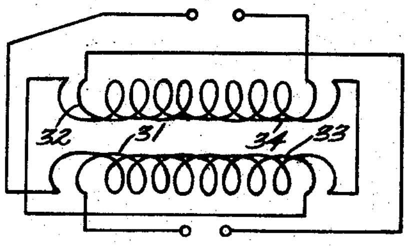
Figure 8 is circuit diagram illustrating the manner in which the coils of each head lamination are connected for energizing the respective gaps.

The head lamination assemblies of the present invention are energized to operate as magnetic modulator heads such as disclosed in my co-pending application Serial No. 294,684, filed June 20, 1952, and entitled "Electromagnetic Head." In such a head the output of a relatively high frequency oscillator is fed to a pair of windings 31 and 32 connected in series aiding relationship as indicated in Figure 8 and wound respectively on the bridging strips 13 and 14. The windings are preferably wound in a bifilar manner with respect to coils 33 and 34, that is, the turns of coils 31 are wound between the turns of coil 33, and the turns of coil 32 are wound between the turns of coil 34 to increase the coupling the reduce unbalance between the coils. The same number of turns appear on bridging strip 13 as appear on bridging strip 14, so that the coils of 31 and 32 are substantially identical in their magnetic behavior.

The second pair of coils 33 and 34 are connected in series opposing relationship on the bridging members 13 and 14 and the output therefrom is connected to the input circuit of a tuned amplifier as disclosed in said co-pending application.

As disclosed in my co-pending application, the output of a magnetic modulator head having windings wound as indicated in Figure 8 normally would be an amplitude modulated signal with a predominating frequency of twice the frequency applied to the oscillator coils 31 and 32. However, the magnitude of the modulation is proportional to the amplitude of the signal flux at the gap 16 regardless of its polarity, so that the head fails to discriminate directly between positive and negative portions of the input signal. There is, however, a difference in phase in the high frequency component parts of consecutive half cycles of the resulting modulated wave. This difference in phase can be used to distinguish between positive and negative cycles of signal flux at gap 16, as follows: The output from the coils 33 and 34 can be delivered to a tuned amplifier and then to a phase modulator where the output signal is mixed with a constant relatively high amplitude signal derived from a frequency doubler, which may comprise any conventional frequency doubling circuit, with the input of the doubler derived from the output of the oscillator connected to the coils 31 and 32. In this case, the input to the doubler is of an amplitude greater than the amplitude of the signal appearing at the output of the amplifier.

In a typical phase modulator, as shown in my copending application, the signal from the tuned amplifier appears across a primary coil inductively coupled to a rectifier network by means of a secondary winding. Similarly, the output from the frequency doubler appears across a further primary coil and is inductively coupled to the opposite side of the rectifier network through a further secondary winding. The rectifier network consists of four rectifier elements connected to provide full wave rectification of the input signal. The output of the mixer rectifier circuit described is taken from center taps on the secondary coils, and may be applied, for example, to a loud speaker for reproducing the recorded intelligence.

In the phase modulator, the constant amplitude signal from the frequency doubler is mixed with the modulated signal from the amplifier. Modulation resulting from signals of one polarity at gap 16 add to the constant signal from the doubler, while those of opposite polarity subtract from the constant signal. The resulting wave, before rectification, has an envelope which varies in exact accordance with the signal impressed at the gap 16. After rectification, the signal is an accurate reproduction of the flux at gap 16.

Alternatively, as indicated in Figures 1 and 5, the magnetic circuit may be unbalanced in quiescent condition by providing a constant, non-alternating magnetic field in the core laminations 11 and 12 by means of a permanent magnet 35 having elongated blocks 36 and 37 of magnetic material connected at the opposite poles of the magnet 35 and extending in closely spaced relation to the lower ends of the lamination members 11*a*, 12*a* and 11*b*, 12*b*, respectively. The level of D. C. polarization may be adjusted by adjusting the spacing of the blocks 36 and 37 from the respective lower ends of the lamination members, and is sufficiently high so that the resultant modulation of the high frequency magnetic field by the signal received at the non-magnetic gap 16 does not reduce the net magnetic field to zero. With no signal flux at gap 16, there is a constant high frequency output from the coils 33 and 34 due to the D. C. polarization. Signal flux of one polarity at gap 16 increases this high frequency signal, while signal flux of opposite polarity decreases the high frequency signal. Thus, the modulation envelope varies in accordance with the signal flux, and a phase modulator system, such as previously described, is unnecessary.

Instead of using a permanent magnet as a source of D. C. bias flux, a D. C. current source may be utilized for supplying D. C. bias current to the windings 33 and 34. For example, if the output from the coils 33 and 34 is supplied to a parallel tuned circuit, a battery having a variable resistor connected thereacross could be connected in circuit in series with the coil of the parallel tuned circuit with a condenser by-passing the variable resistor at signal frequencies.

As a further alternative, if the coils 33 and 34 were connected across a series tuned circuit, a battery and variable resistor in series could be connected in parallel across the series tuned circuit to supply the bias current.

Other methods of obtaining a useful output from the modulator head herein disclosed have been described in detail in the co-pending application, Serial No. 294,684 about mentioned, and the disclosure of that application is expressly incorporated herein and made a part hereof.

It has further been found that in the use of a magnetic modulator head such as herein contemplated, the signal-to-noise ratio is unsatisfactory unless special precautions are taken to properly select the cross-sectional area of bridging members 13 and 14. I have discovered that the noise is reduced as the cross-sectional area of the saturating parts is reduced and that, within limits, the strength of the useful signal from the head is essentially unaffected by this reduction in cross-section.

I have found that optimum signal-to-noise ratio and linear operation are obtained when the saturating parts 13 and 14 are narrowed down so that a maximum signal on the tape will produce a flux density in the saturating members 13 and 14, which when added to any polarizing flux density is ⅔ of saturation for the material of the saturating members. The useful range of cross-sectional areas of the saturating members has been found to be such that the maximum residual flux capacity of the record medium added to any polarizing flux will produce a flux density in the saturating members between ⅓ and ⅔ of saturation for the material of the saturating members. In other words, the maximum flux capacity of the record medium plus the polarizing flux equals ⅓ to ⅔ of the product of the value of the saturation induction for the material of the saturating members and the cross section thereof.

It will be understood that modifications and variations may be effected without departing from the scope of the novel concepts of the present invention.

I claim as my invention:

1. A multiple gap head comprising a plurality of head lamination assemblies stacked to provide a series of non-magnetic gaps for cooperation with a record medium, said lamination assemblies each comprising a pair of separate and individual core laminations having a non-magnetic gap therein, and a bridging member having its opposite ends sandwiched between said core laminations and completing a closed magnetic circuit with said core laminations including said gap, said bridging members being relatively thin compared to the thickness of each of the core laminations so as to fit between said core laminations while accommodating snug lateral contact between the laminations at said gap.

2. A multiple gap head comprising a plurality of head lamination assemblies stacked to provide a series of non-magnetic gaps lying in a straight line, said lamination assemblies each comprising a pair of separate and individual flat core laminations having a non-magnetic gap therein, and bridging members having respective opposite ends of flat strip construction sandwiched between said core laminations and completing closed magnetic circuits with said core laminations including said non-magnetic gap, said bridging members being relatively thin compared to the thickness of each of the core laminations so as to fit between said core laminations while accommodating snug lateral contact between the laminations at said gap.

3. A multiple gap head comprising a plurality of head lamination assemblies stacked to provide a series of non-magnetic gaps lying in a straight line, said lamination assemblies each comprising a pair of separate and individual core laminations having a non-magnetic gap therein, and bridging members having respective opposite ends, sandwiched between said core laminations and completing closed magnetic circuits with said core laminations including said non-magnetic gap, and eddy-current shielding means between adjacent pairs of core laminations to isolate the gaps thereof.

4. A multiple gap head comprising a plurality of head lamination assemblies stacked to provide a series of non-magnetic gaps lying in a straight line, said lamination assemblies each comprising a pair of separate and individual core laminations having a non-magnetic gap therein, and bridging members having ends sandwiched between said core laminations and completing closed magnetic circuits with said core laminations including said non-magnetic gap, and eddy-current and magnetic shielding means between adjacent pairs of core laminations to isolate the gaps thereof, said eddy-current and magnetic shielding means between adjacent pairs of core laminations being of total thickness less than the combined thickness of the two core laminations of each pair, and the spacing between said non-magnetic gaps being substantially equal to the combined thickness of the eddy-current and magnetic shielding means between adjacent pairs of core laminations.

5. A multiple gap head comprising a plurality of head lamination assemblies stacked to provide a series of non-magnetic gaps lying in a straight line, said lamination assemblies each comprising a pair of flat planar core laminations having a non-magnetic gap therein, and bridging members having respective opposite ends of flat strip construction sandwiched between said core laminations and completing closed magnetic circuits with said core laminations including said non-magnetic gap, eddy-current and magnetic shielding means between adjacent pairs of core laminations to isolate the gaps thereof, and coil means on each bridging member and within the confines of the associated lamination assembly.

6. A multiple gap head comprising a plurality of head lamination assemblies stacked to provide a series of non-magnetic gaps lying in a straight line, said lamination assemblies each comprising a pair of core laminations having a non-magnetic gap therein, and bridging members sandwiched between said core laminations and completing closed magnetic circuits with said core laminations including said non-magnetic gap, said bridging members being of cross-section such that the maximum flux to be introduced at the gap will produce a flux in the lamination assembly between ⅓ and ⅔ of the maximum flux capacity of the bridging members.

7. A multiple gap head comprising a plurality of head lamination assemblies stacked to provide a series of non-magnetic gaps lying in a straight line, said lamination assemblies each comprising a pair of core laminations having a non-magnetic gap therein, and bridging members sandwiched between said core laminations and completing closed magnetic circuits with said core laminations including said non-magnetic gap, and means for introducing a D. C. polarizing flux into said core, said means comprising a pair of elongated parallel blocks of magnetic material extending in proximity to respective space points in each lamination magnetic circuit and a permanent magnet means extending between the blocks.

8. A core lamination assembly comprising a pair of core laminations each comprising a pair of inverted L-shaped members defining therebetween a non-magnetic gap, and a pair of bridging members extending between the legs of the L-shaped members and having flat end portions sandwiched between the core laminations to provide a pair of magnetic circuits including said non-magnetic gap.

9. A head lamination assembly comprising a pair of core laminations each comprising a pair of inverted L-shaped members defining a non-magnetic gap, and a pair of bridging members spanning between the legs of the L-shaped members and defining therewith a pair of magnetic circuits including said non-magnetic gap, said bridging members having flat end portions sandwiched between said core laminations, and laterally adjacent L-shaped members of each pair of core laminations being in lateral contact adjacent said gap but being laterally spaced the thickness of said bridging members at regions remote from said gap.

10. A head lamination assembly comprising a pair of core laminations each comprising a pair of inverted L-shaped members defining a non-magnetic gap, a pair of bridging members spanning between the legs of the L-shaped members and defining therewith a pair of magnetic circuits including said non-magnetic gaps, said bridging members having flat end portions sandwiched between said core laminations, and eddy-current shielding strips secured on opposite sides of said gap in face-to-face relation to the outer surfaces of the respective core laminations.

11. A multiple gap head comprising a plurality of head lamination assemblies stacked to provide a series of non-magnetic gaps, said lamination assemblies each comprising a pair of core laminations, said core laminations each comprising a pair of inverted L-shaped members defining therebetween a non-magnetic gap, bridging members spanning between the legs of the L-shaped members, and eddy-current shielding strips interposed between adjacent pairs of core laminations to isolate the respective gaps, adjacent L-shaped members of each pair having pole portions secured together to provide a low reluctance path therebetween and having legs extending on opposite sides of the bridging members and secured therewith to provide a relatively low reluctance path between the legs and bridging member therebetween.

12. A multiple gap head comprising a plurality of head lamination assemblies stacked to provide a series of non-magnetic gaps, said lamination assemblies each comprising a pair of core laminations, said core laminations each comprising a pair of inverted L-shaped members defining therebetween a non-magnetic gap, and bridging members spanning between the legs of the L-shaped members, eddy-current shielding strips secured to the outer sides of each pair of core laminations adjacent the gap therein, a further shield strip of magnetic material interposed between the eddy-current shielding strips to further isolate adjacent gaps, and coil means on each of said bridging members within the confines of the associated head lamination assembly, a pair of elongated magnetic blocks extending in proximity to respective spaced points of each of the lamination assemblies, and permanent magnet means spanning between said blocks for establishing magnetic fields in each of said lamination assemblies.

13. A multiple gap head comprising a plurality of head lamination assemblies stacked to provide a series of non-magnetic gaps for cooperation with a record medium, said lamination assemblies each comprising a flat planar core lamination of relatively large cross-sectional area having a non-magnetic gap therein, and a pair of flat planar saturating strips of relatively small cross sectional area completing closed magnetic circuits with said core lamination including said non-magnetic gap, said saturating strips being of cross section such that the maximum flux to be introduced at the gap will produce a flux in the saturating strips between 1/3 and 2/3 of the maximum flux capacity of said saturating strips.

14. A magnetic head comprising a flat planar magnetic core of relatively large cross sectional area having a non-magnetic gap therein defined by a pair of poles of said core, a flat planar saturating strip of relatively small cross sectional area bridging between spaced portions of said core to complete a magnetic circuit including said non-magnetic gap, the saturating strip engaging flatwise with said spaced portions of said core, winding means on said saturating strip, and eddy-current shields of flat planar strip material bonded to said poles of said core on each side of the core and extending between the poles at the gap therebetween.

15. A multiple gap head assembly having a plurality of heads as defined in claim 14 stacked together with flat strips of magnetic material between adjacent eddy-current shields of adjacent head assemblies and with the strips of magnetic material bonded to the adjacent eddy-current shields to form a unitary multiple gap assembly.

16. A magnetic head comprising a pair of separate and individual core laminations having a non-magnetic gap therein, and magnetically saturable means having opposite ends sandwiched between the core laminations and completing a closed magnetic circuit with said core laminations including said gap.

17. A magnetic head comprising a pair of separate and individual core laminations having a non-magnetic gap therein, and magnetically saturable means having opposite ends sandwiched between the core laminations and completing a closed magnetic circuit with said core laminations including said gap, said magnetically saturable means comprising flat strip material of rectangular cross-section and of thickness of the order of .001 inch.

References Cited in the file of this patent

UNITED STATES PATENTS

| | | |
|---|---|---|
| 2,413,108 | Hatchford | Dec. 24, 1946 |
| 2,428,449 | Camras | Oct. 7, 1947 |
| 2,493,742 | Begun | Jan. 10, 1950 |
| 2,535,480 | Begun | Dec. 26, 1950 |
| 2,536,260 | Burns | Jan. 2, 1951 |
| 2,548,109 | Howey | Apr. 10, 1951 |
| 2,618,709 | Eckert | Nov. 18, 1952 |
| 2,628,286 | Rettinger | Feb. 10, 1953 |
| 2,644,856 | Pettus | July 7, 1953 |
| 2,722,569 | Loper | Nov. 1, 1955 |
| 2,769,036 | Selsted | Oct. 30, 1956 |

UNITED STATES PATENT OFFICE

CERTIFICATION OF CORRECTION

Patent No. 2,855,465 October 7, 1958

David E. Wiegand

It is hereby certified that error appears in the above numbered patent requiring correction and that the said Letters Patent should read as corrected below.

Column 4, line 69, after "gap" strike out the comma and insert instead a period; same line 69, beginning with "said bridging members" strike out all to and including "at said gap." in line 73, same column.

Signed and sealed this 9th day of May 1961.

(SEAL)
Attest:

ERNEST W. SWIDER
Attesting Officer

DAVID L. LADD
Commissioner of Patents